(12) United States Patent
Hesser et al.

(10) Patent No.: US 6,966,337 B2
(45) Date of Patent: Nov. 22, 2005

(54) MEANS FOR AUXILIARY MANUAL OPERATION

(75) Inventors: Robert Hesser, Wendlingen (DE); Bernhard Walter, Ailingen (DE)

(73) Assignee: Festo AG & Co., Esslingen (DE)

(*) Notice: Subject to any disclaimer, the term of this patent is extended or adjusted under 35 U.S.C. 154(b) by 127 days.

(21) Appl. No.: 10/694,424

(22) Filed: Oct. 27, 2003

(65) Prior Publication Data

US 2004/0099830 A1    May 27, 2004

(30) Foreign Application Priority Data

Nov. 21, 2002 (DE) .............................. 102 54 177

(51) Int. Cl.[7] .......................................... F15B 13/044
(52) U.S. Cl. ............................. 137/625.65; 251/129.03
(58) Field of Search ............... 137/625.65; 251/129.03

(56) References Cited

U.S. PATENT DOCUMENTS 5,443,093 A * 8/1995 Stoll et al. ............. 251/129.03
6,450,198 B1    9/2002 Bouteille
6,527,248 B1 * 3/2003 Muller .................. 251/129.03

FOREIGN PATENT DOCUMENTS

| DE | 1908689 | 8/1970 |
|---|---|---|
| DE | 7143862 | 11/1972 |
| DE | 39 41 643 C1 | 5/1991 |
| DE | 196 09 987 A1 | 1/1997 |

* cited by examiner

*Primary Examiner*—Gerald A. Michalsky
(74) *Attorney, Agent, or Firm*—Hoffman & Baron, LLP

(57) ABSTRACT

Auxiliary manual operation on a bistable multiway valve is achieved with a valve member able to be reciprocated with the performance of a switching movement and furthermore operating device extending athwart the direction of the switching movement. There is a provision such that the operating device includes at least two mutually parallel plungers, which on operation act on second different flanks of the valve member, operation of one plunger locking the respectively other plunger.

16 Claims, 4 Drawing Sheets

MEANS FOR AUXILIARY MANUAL OPERATION

BACKGROUND OF THE INVENTION

The invention relates to a means for auxiliary manual operation on a bistable multiway valve.

THE PRIOR ART

Means for the auxiliary manual operation of routing valves are known. If valves are furnished with a means for auxiliary manual operation, the valve member may be switched independently of the operating means actually provided for valve operation may be operated from time to time manually. This is for instance an advantage, if the respective valve is associated with a control setting its switching cycle and is to be operated for test purposes or because an exceptional event makes it necessary for a switching operation to be brought about. In addition a means may be employed for auxiliary manual operation in the case of failure of the actual operating means or, respectively, its operating medium as an emergency measure.

Such auxiliary manual operations are known in connection with monostable multiway valves, see for example the German patent publication 3,941,643 C1 and the German patent publication 19,609,987 C2. If a valve member possesses two stable settings (bistable design), it is then desirable to be able to move the valve member into the respectively other stable end position. In this respect it is important to have accurate predetermined operating and switching settings.

SHORT SUMMARY OF THE INVENTION

One object of the invention is to provide a reliably operating auxiliary manual means for a bistable multiway valve which substantially prevents improper operation.

In order to achieve these and/or other objects appearing from the present specification, claims and drawings, in the present invention a means for auxiliary manual operation on a bistable multiway valve comprises a valve member adapted to reciprocate for switching between two switching positions with the performance of a switching movement and furthermore an operating device (able to be moved athwart directions of movement extending in the direction of the switching movement), said operating device having at least two plungers arranged in parallelism to each other, adapted to act on respectively different flanks of the valve member, on operation, operation of one plunger involving locking of the respectively other plunger.

The means in accordance with the invention for auxiliary manual operation on a bistable multiway valve has an operating device comprising at least two plungers arranged in parallelism to each other. The two plungers may be moved in directions of operation extending athwart the direction of the switching movement of the valve member and then act on respectively different flanks of the valve member. On operation of one of the two plungers the respectively other plunger is simultaneously locked. Thus it is possible to reliably prevent improper operation, even if the plungers are fitted close to one another. The small overall size of the auxiliary manual operation means is desirable for reasons of compactness of the valve, although however in the case of there being a lack of a possibility of locking there is danger of improper operation. Such improper operations are prevented in the case of the means in accordance with the invention because a depressed plunger acts not only on the valve but also simultaneously locks the other plunger. Furthermore, accidental simultaneous depressing of both plungers is prevented, since in this case both plungers are locked and therefore can not be depressed.

Further advantageous developments of the invention are defined in the claims.

The two plungers preferably act in opposite switching directions on the valve member so that owing to depression of one respective valve member is shifted into one of the two stable terminal positions. The valve member may for example possess an electromagnetic drive control and preferably is one valve member of a pilot valve switching the control pressure of a master or principal valve. The two bistable terminal positions of the pilot valve may for example be produced by cooperation of a permanent magnet with a return spring. One of the two switching positions is set by the return spring. The other switching position may be set by the attracting action of a magnet. As soon as the valve member has been moved together with the magnet arranged on it by the electromagnetic control drive into a position at a certain distance from the magnet's opposite surface, the magnetic forces become so weak that the spring forces of the return spring overwhelm them.

With the first plunger in the depressed state a flexible locking arm will lock the second plunger in its initial position. When the second plunger is depressed the first plunger will be locked in its initial position either by the same flexible locking arm or a further arm. Thus positive operation is ensured, which will reliably prevent improper operation.

The locking arm possesses, in accordance with a development of the invention, a top end face, which, when one plunger is depressed, cooperates with a locking face, facing in the direction of operation, of the respectively other plunger. If two locking arms are present, both will have a symmetrical configuration with, respectively, a top terminal face, which when the plunger is depressed will cooperate with a locking face, facing in the direction of operation, of the respectively other plunger. The plungers preferably respectively have an oblique face facing in the direction of operation, which cooperates with the top terminal face of the locking arm. Accordingly, a reliable mechanical locking action is ensured, which is free of any detectable wear and comprises only a few parts. The principal functional parts operate without hinges or the like for which reason they will continue to function over long periods of time reliably.

The locking arm is able to be set in position on depressing one of the two plungers by means of its oblique face toward the respectively other plunger, its locking face resting on the top terminal face of the locking arm. The plungers preferably respectively have an inclined bottom oblique face, such faces respectively cooperating with one of the two flanks of the valve member.

The plungers are preferably held by resilient force in their initial position. For the purpose of resetting the plungers in their initial position preferably a return spring is provided, which is arranged around the locking arms and on which the locking face of the two plungers acts.

The locking arms are preferably at least partially fabricated of flexible plastic so that they have a degree of flexibility which is suitable for their function. The plungers themselves may be selectively manufactured of plastic or metal. The locking arms of flexible plastic ensure a constant function over a long period of time, since there is no wear.

Further aspects and advantageous features of the invention will be perceived from the following description.

Further advantageous developments and convenient forms of the invention will be understood from the following detailed descriptive disclosure of the embodiment thereof in conjunction with the accompanying drawings.

LIST OF THE SEVERAL VIEWS OF THE FIGURES

FIGS. 3 through 6 respectively perspective, diagrammatic representations of the operating drive of the auxiliary manual operation means in various different switching positions.

DETAILED ACCOUNT OF WORKING EMBODIMENTS OF THE INVENTION

Figure 1:
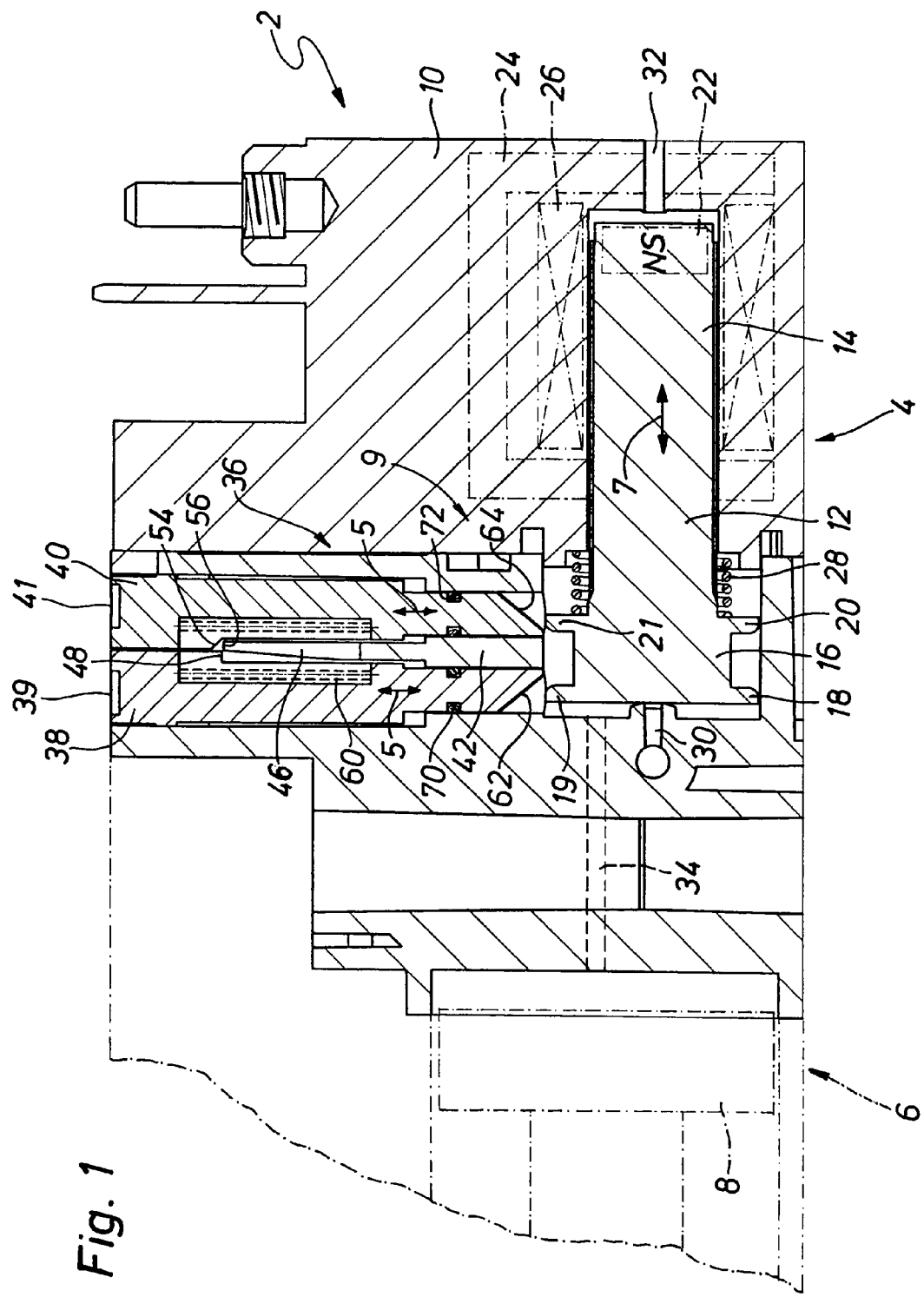
FIG. 1 shows part of the multiway valve fitted with an auxiliary manual operation means in accordance with the invention, the auxiliary manual operation means being illustrated in the non-operated condition.

FIG. 1 shows a bistable multiway valve 2 which comprises a pilot valve 4 for electromagnetic operation and a master valve 6. Pilot pressure for the master valve 6 is switched by a pilot valve 4, operated by means of magnetic force and moved into two switching positions as part of a switching movement and having for example a cylindrical valve member 12. For this purpose a pressure port 30 is either closed or connected with a working port 34, which is connected with power connection 34, which leads to the master valve 6. Furthermore, the power port 34 is connected with a venting port 32 when the pressure port 30 is closed. The pilot valve 4 is accordingly a 3/2 way valve to use conventional terminology.

The valve member 22 is drawn into the left hand switching position by a first return spring 28 and may be drawn by the magnetic force of a coil 26 into the right hand switching position. Here it is held in a stable manner against the return force of the first return spring 28 by the attracting force of a permanent magnet 22 arranged in the valve member 12, such permanent magnet 22 acting on the corresponding face in the valve housing 10. The magnetic force can switch the valve member 12 back into the left hand switching position. As soon as the attracting force of the magnet 22 at a respective magnetic counter face around the venting port 32 weakens, the return force of the spring 28 will be overwhelming so that the valve member 12 is thrust into the right hand terminal position.

On the left hand side in drawing for instance the valve member 12 has a control section 16. This control section 16 controls a connection between the pressure port 30 and the power port 34. When the valve member 12 is moved clear of the left abutment face, the pressure connection between the ports 30 and 34 is opened and the valve spool 8 of the master valve 6 is acted upon by pressure.

The valve member 12 has an armature section 14 illustrated in drawing to the right of the control section 16 and such section 14 cooperates with the coil 26, which is arranged within a yoke 24 in the valve housing 10. The coil 26, the yoke 24 and the permanent magnet 22 are only indicated in chained lines.

The control section 16 comprises on the side a first and a second projection 18 and 20, which have a first flank 19 and, respectively, a second flank 21. The projections are more particularly annular in form and are arranged concentrically on the valve member 12. An operating device 36 can act on either flank 19 and 21, said means consisting essentially of two spring loaded plungers 38 and 40. The plungers 38 and 40 are able to be reciprocated normally to the switching direction 7 of the valve member 12 in directions 5 as indicated by a double arrow and act at the bottom oblique faces 62 and 64, facing the valve member 12, on respectively one of the two flanks 19 and, respectively, 21.

By depressing one respective one of the two plungers 38 and 40 the valve member 12 is accordingly shifted to the right or to the left. The two plungers accordingly constitute substantial components of a means, termed a auxiliary manual operation means for short, for auxiliary manual operation 9 of the multiway valve 2.

For sealing the pilot space around the control section 16 from the outside, at the lower cylindrical sections facing the valve member 12, the plungers 38 and 40 possess a respective annular groove 72 with an annular seal 70 therein. The annular seal 70 is typically a so-called O-ring.

A second return spring 60 ensures that the plungers 38 and 40 do not, in the non-depressed state, act on the valve member 12 and are cleared from the flanks 19 and 21. A locking element 42, explained on the basis of the following figures comprises two locking arms 44 and 46, whose front terminal faces (which infra will be termed the top terminal faces 56 and, respectively, 58) respectively may cooperate with facing locking faces 48 and, respectively, 50 (which in this case face downward) of the plungers 38 and 40 and in alternate succession lock them.

For the manual operation the plungers 38 and 40 respectively have operating faces 39 and, respectively, 41, which extend in an outward direction and preferably end flush with the surrounding valve housing 10. These faces are for manual operation and in the case of a miniature valve may be designed for being moved with a pointed tool.

Figure 2:
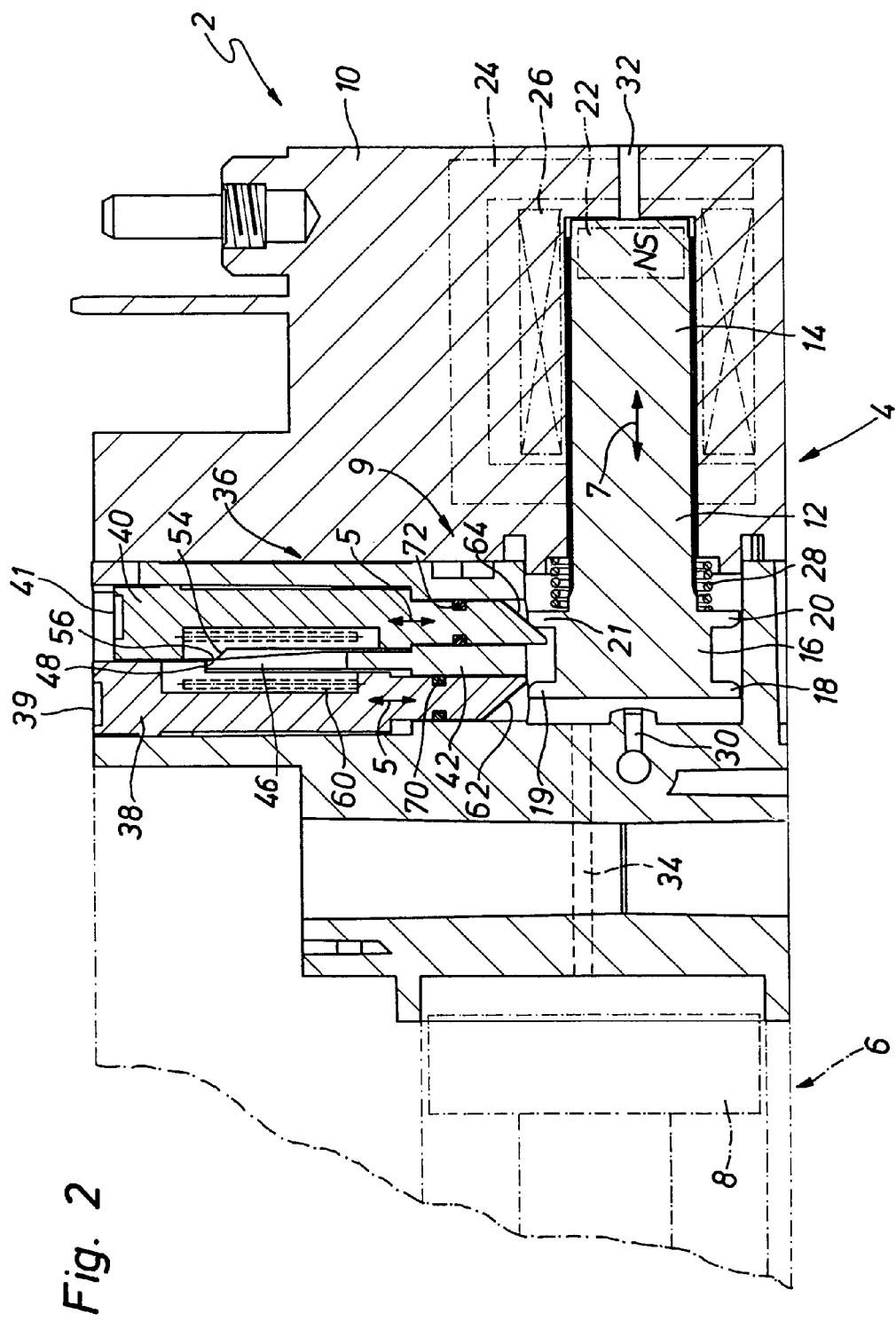
FIG. 2 shows the arrangement of FIG. 1 in the operated state of the auxiliary manual operation means.

FIG. 2 shows the multiway valve 2 as in FIG. 1 but with the operating device 36 depressed. For example in this case the right second plunger 40 is thrust downward so that its second bottom oblique face 54 acts on the second flank 21 of the second projection of the valve member 12. This means that the valve member 12 has been thrust to the right so that the pressure port 30 is connected with the power port 34 master valve 6 so that same is acted upon by the power pressure.

By depressing the second plunger 40 a second locking arm 46 is tilted toward the first plunger 38 and locks it. For this purpose the plunger has a second oblique face 54 on its inner side, such face cooperating with a terminal face 58 of the flexible, pliant second locking arm 45 and pushes same under a first locking face 48 of the first plunger 38. In the same manner the completely symmetrically designed plunger 38 may also be operated, in which case the second plunger 40 is locked by a similar first locking arm 44.

Figure 3:
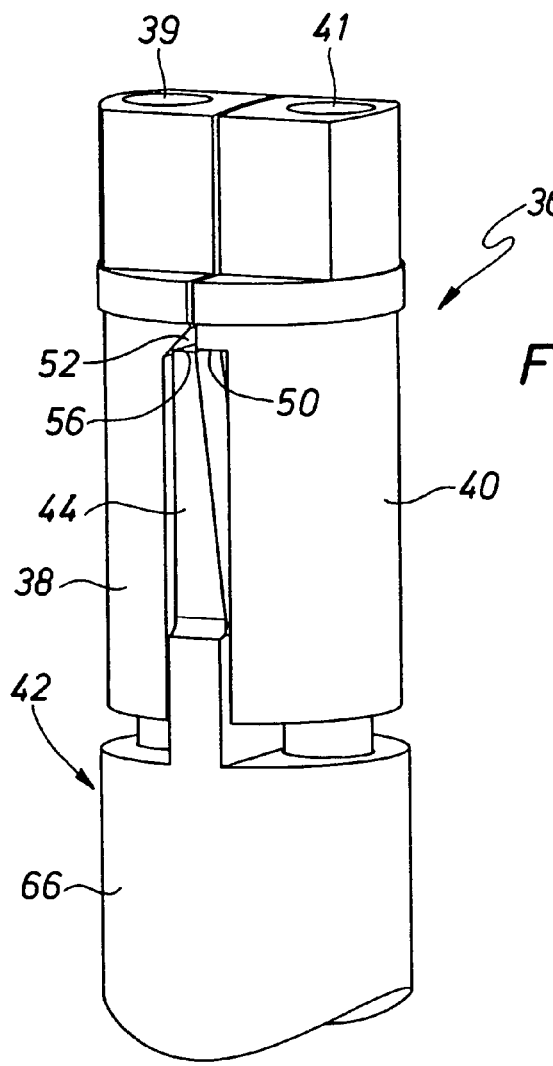

FIG. 3 shows a diagrammatic perspective representation of (a) the operating device 36 with the locking element 42, with the upwardly pointing locking arms 44 and 46 arranged between the plungers 38 and 40 and (b) the two plungers 38 and 40, which cooperate with the locking arms 44 and 46. The locking element 42 is in its bottom part in the form of a cylindrical section 66 and has two holes 68 for cylindrical bottom sections of the plungers 38 and 40 (see also FIG. 6). The cylindrical bottom sections of the plungers 38 and 40 are in each case provided with seal rings 70 for sealing (see FIGS. 1 and 2).

In the showing of FIG. 3 neither of the two plungers 38 and 40 is depressed so that the locking arms 44 and 46 are not deformed. Each of the two plungers may now be depressed selectively.

Figure 4:
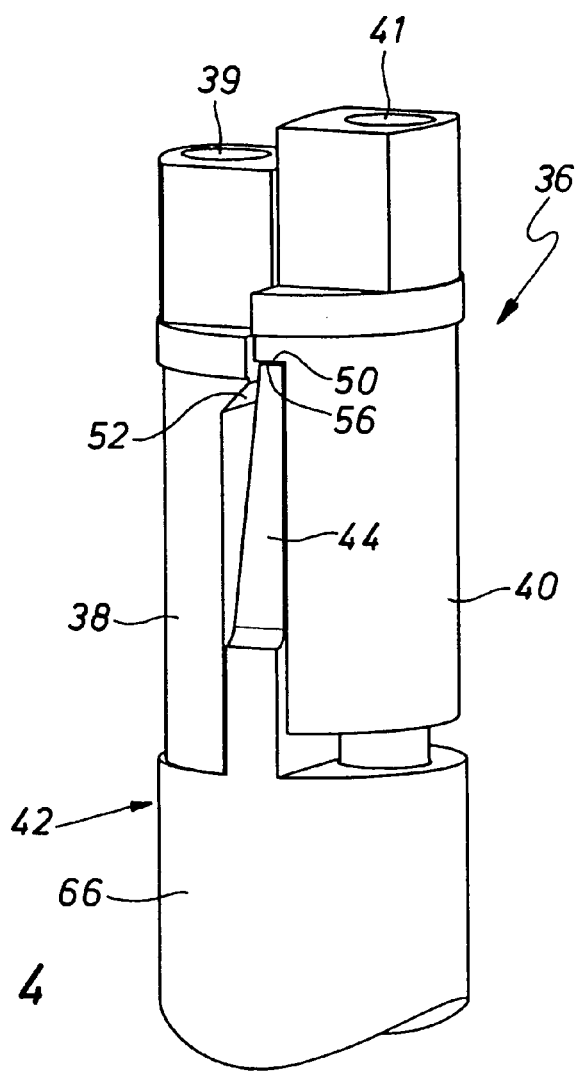

FIG. 4 shows the left first plunger 38 in the downwardly depressed state so that the corresponding first locking arm 44 is moved underneath the plunger 40. The flexible deformation of the first locking arm 44 takes place owing to the sliding of its top edge on the downwardly directed first oblique face 52 of the first plunger 38. The upwardly facing first terminal face 56 of the first locking arm 44 slides along this first oblique face 52 until it is located underneath the second locking face 50 of the second plunger 40. The second plunger 40 is accordingly locked.

Figure 5:
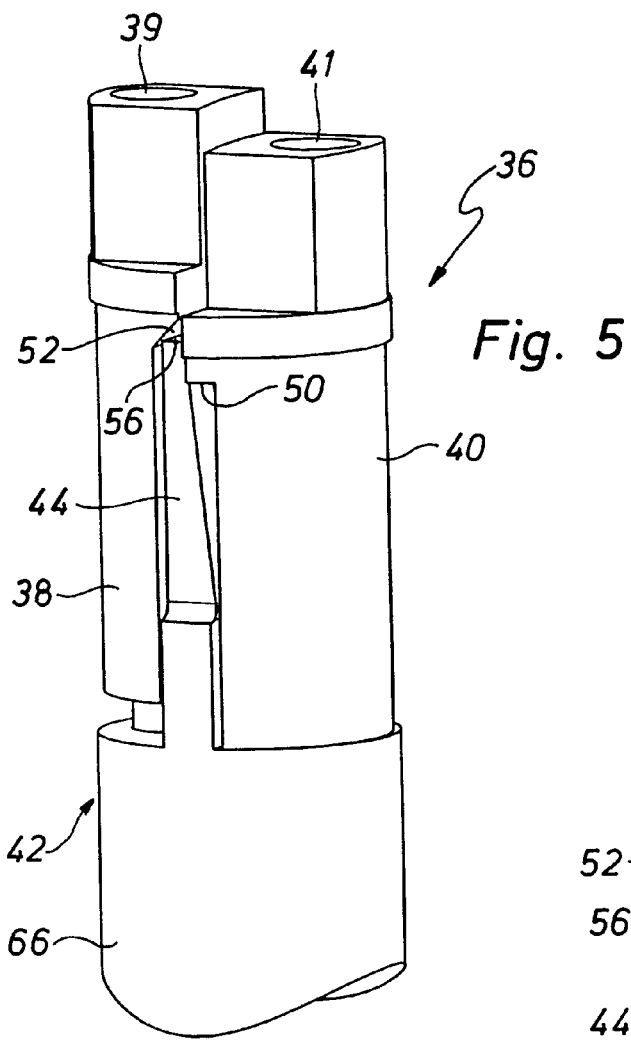

FIG. 5 shows the right second plunger 40 in a downwardly depressed state, the first plunger 38 being in a locked state. A second locking arm 46, not illustrated here, is now swung underneath the first locking face 48 of the first plunger 38. The first locking arm 44 is now located in a relaxed position underneath the first oblique face 52 of the first plunger 38 and in this manner serves for additionally locking the non-depressed first plunger 38, since same can not press the first locking arm 44 out of the way. In such a case the already depressed second plunger 40 would be in the way of the first locking arm 44.

Figure 6:
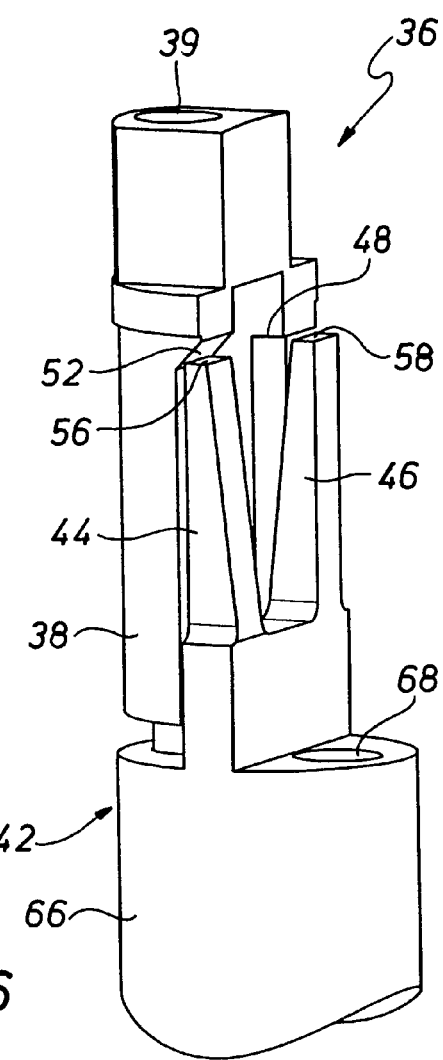

FIG. 6 is a perspective view of the locking element 42 and of the first plunger 38 with the second plunger 40 omitted. In this case a forked arrangement constituted by the two locking arms 44 and 46 is particularly well illustrated.

The locking element 42 may then be advantageously be manufactured integrally of plastic which is at least in part flexible, the elasticity of the locking arms desired for pivoting being then able to be achieved. The plungers themselves may selectively be manufactured of plastic or furthermore of a suitable metal, as for example aluminum.

What is claimed is:

1. A means for auxiliary manual operation on a bistable multiway valve comprising a valve member adapted to reciprocate for switching between two switching positions with the performance of a switching movement and furthermore an operating device, able to be moved in directions of operation extending athwart the direction of the switching movement, said operating device having at least two plungers arranged in parallelism to each other, adapted to act on respectively different flanks of the valve member, on operation, operation of one plunger involving locking of the respectively other plunger.

2. The means as set forth in claim 1 wherein the plungers are adapted to act in respectively opposite switching directions on the valve member.

3. The means as set forth in claim 1 wherein, with the plunger depressed, one locking element locks the other plunger in its initial position and vice versa.

4. The means as set forth in claim 3 wherein the locking element comprises two locking arms.

5. The means as set forth in claim 4 wherein the plungers respectively have an oblique face and a locking face facing in the direction of operation, and wherein one of the locking arms is able to be moved toward the respectively other plunger on depression of one of the two plungers by means of its oblique face, its locking face being in front of the front terminal face of the locking arm.

6. The means as set forth in claim 1 wherein, with the first plunger depressed, a pivotal locking arm of the second plunger locks the second plunger in its initial position and vice versa.

7. The means as set forth in claim 6 wherein the respective locking arm is elastically pliant in order to render the pivotal movement possible.

8. The means as set forth in claim 6 wherein the locking arm possesses a front terminal face, which, when the plunger is depressed, cooperates with a locking face of the respectively other plunger, such locking face facing in the direction of operation.

9. The means as set forth in claim 6 wherein the plungers respectively have an oblique face facing in the direction of operation, such oblique face being able to cooperate with the front terminal face of the locking arm.

10. The means as set forth in claim 9 wherein, on depressing one of the two plungers, the locking arm is arranged to be moved by its oblique face toward the respectively other plunger, its locking face being in front of the front terminal face of the locking arm.

11. The means as set forth in claim 6 wherein at least one locking arm is manufactured of at least partially flexible plastic.

12. The means as set forth in claim 1 wherein the plungers respectively have an inclined bottom oblique face facing the valve member, such plunger being able to cooperate with a flank of the valve member.

13. The means as set forth in claim 1 wherein the plungers are respectively held in their initial position by spring force and more particularly are held by at least one return spring.

14. The means as set forth in claim 13 comprising a common return spring for the two plungers.

15. The means as set forth in claim 13 wherein at least one plunger includes a locking face facing in the direction of operation, and wherein said at least one return spring acts on the locking face.

16. The means as set forth in claim 13 wherein the return spring is arranged around a locking arm arranged between the two plungers.

* * * * *